Feb. 26, 1957  C. E. MANDEVILLE ET AL  2,783,386
DEVICE FOR DETERMINING THE INTENSITY OF NUCLEAR RADIATION
Filed March 29, 1954

INVENTORS.
CHARLES E. MANDEVILLE
HERBERT O. ALBRECHT
BY
ATTORNEYS

United States Patent Office 2,783,386
Patented Feb. 26, 1957

2,783,386

DEVICE FOR DETERMINING THE INTENSITY OF NUCLEAR RADIATION

Charles E. Mandeville, Houston, Tex., and Herbert O. Albrecht, Springfield, Pa., assignors, by mesne assignments, to the United States of America as represented by the Secretary of the Navy Application March 29, 1954, Serial No. 419,637

1 Claim. (Cl. 250—71)

This invention relates to improvements in measuring instruments, and more particularly pertains to instruments for measuring the intensity of exposure of an environment to nuclear radiation devices for determining the intensity of a burst of nuclear radiation to which an environment has been exposed.

Various devices and methods have been employed in the past to determine the intensity of exposure of an environment to nuclear radiation. Ionization chambers, photographic film, counters and the like have been employed for use in the direct detection of nuclear radiation. However, such devices and methods require elaborate instrumentation, and consequently are not adapted for mass distribution in connection with the investigation, at varying times after the event, of the exposure of an environment to a burst of nuclear radiation.

The alkali halides, such as thallium activated sodium iodide, are known universally as efficient phosphors for use in scintillation counting. Other useful properties of these materials, properties related indirectly to the fluorescent emission, are their phosphorescent afterglow and energy storage characteristics. There is an emission of light from the excited phosphor after the cessation of irradiation, and there is a significant storage of energy in the irradiated phosphor.

The phosphorescent afterglow results from the escape of electrons from shallow traps. The kinetic energy of escape is supplied by the environmental temperature. Thus, the phosphorescent emission at liquid nitrogen temperature is far less than that encountered at room temperature (circa 25° C.). If the trap depths are great enough, thermal agitation at room temperature may be insufficient to dislodge the trapped electrons, which will remain stored in excited states in the solid. Such trapped electrons will escape, however, by thermostimulation— heating of the phosphor—or by photostimulation—irradiation by near ultraviolet, visible or red light.

The primary excitant may take any one of several forms. Such primary excitant can be X-rays, beta rays, gamma rays, alpha particles or ultraviolet light. Irradiation by the more energetic excitants removes the electrons from the filled band and places them in the conduction band of the phosphor. These electrons can be subsequently trapped in imperfections, forming F-centers, F'-centers, and the like. However, the ultraviolet light is not energetic enough to bring about this condition through absorption of a single photon. It may, however, excite bound electrons in the heavy activator ion to metastable states.

Whether metastable state or imperfection trap, the potential barrier to escape may be so great that thermal liberation at room temperature is very rare. Consequently, the alkali halides that exhibit the above-mentioned storage characteristic can serve as dosimeters for measurement of nuclear radiation: after receipt of an initial burst of nuclear radiation, the irradiated phosphor can be interrogated days, weeks or even months afterwards to ascertain the previously received dosage. A particular alkali halide found to be well suited for such purposes is silver-activated sodium chloride.

Accordingly, the principal object of this invention is to provide a dosimeter for indicating exposure of an environment to a burst of nuclear radiation.

Another object is to provide a dosimeter of an alkali halide phosphor adapted to store energy in the irradiated phosphor thereof, whereby indication of exposure of an environment to a burst of nuclear radiation can be observed.

A further object is to provide apparatus for determining the intensity of a burst of nuclear radiation to which an environment has been exposed.

Other objects and many of the attendant advantages of this invention will be readily appreciated as the same becomes better understood by reference to the following detailed description when considered in connection with the accompanying drawing wherein.

Similar numerals refer to similar parts throughout the several views.

Figure 1:
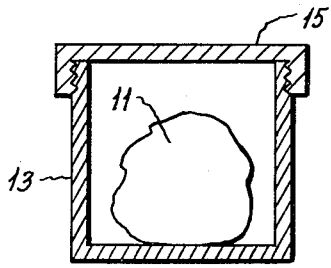
Fig. 1 is a sectional elevation of a dosimeter, showing a preferred embodiment of the invention.

In the following analysis and description, the phosphors employed were polycrystalline masses produced by fusion in a platinum crucible and subsequent rapid cooling on a glass plate, the characteristics of such phosphors being known to be substantially equivalent to the characteristics of phosphors of single crystals.

Many of the alkali halide phosphors are double banded, with emission to be found in both ultraviolet and visible bands. Under certain circumstances, the two bands can be studied separately in photomultiplier tubes 17 with the aid of a properly chosen filter 21. The filter 21 can be Pyrex (3mg./cm.$^2$) or a side wall 1 mm. thick of Corning 9741 glass, whereby maximum spectral response at ~2500 A. is provided with no detectable response above ~3000 A. However, it is more convenient to separate the two bands by means of a photosensitive Geiger counter 23 for ultraviolet detection and a photomultiplier tube 25 such as the RCA-5819 for measurement of the visible emission. The RCA-1P28 is also of considerable value, because it responds to both visible and ultraviolet. When enclosed in a cylinder of soft glass, the 1P28 responds to the visible radiation alone. The Geiger counter is of particular value in measurement of the photostimulated release of the "stored" ultraviolet, because it does not respond to the stimulating radiation. Measurement of the photostimulated emission by means of a D. C. galvanometer 27 can proceed simultaneously with stimulation. The D. C. current is taken as a measure of phosphorescent intensity.

Figure 2:
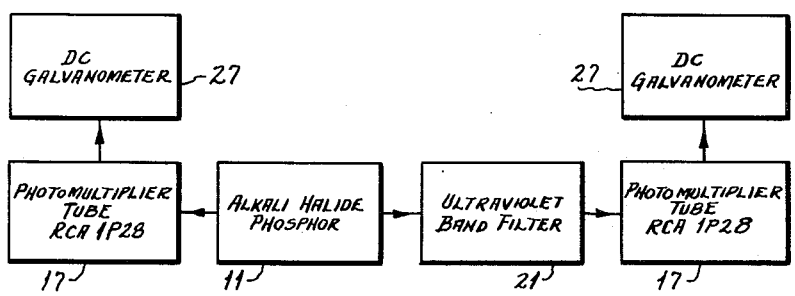
Fig. 2 shows schematically a means for detecting and measuring ultraviolet band and visible band emission in the study of phosphorescence immediately following excitation.
Figure 3:
Fig. 3 shows schematically a means for detecting and measuring ultraviolet band and visible band emission using a photomultiplier tube sensitive to the visible band and a Geiger counter for ultraviolet band detection.
Figure 4:
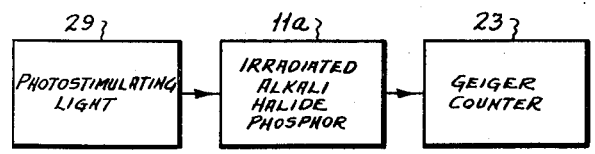
Fig. 4 shows schematically a means to measure dosage in the field.

Study of the phosphorescence immediately following excitation thus can be accomplished as shown in Figs. 2 and 3. To measure the dosage in the field, after the phosphorescence measurable by such means has disappeared and the electrons remain stored in deep traps, the combination shown in Fig. 4 can be employed. The stored electrons in the irradiated alkali halide phosphor 11a can be released by exposure to a photostimulating light 29, such electrons returning to their natural unexcited states with emission of both visible and ultraviolet light. (However, it is convenient to detect only the ultraviolet light in the Geiger counter, since a photomultiplier would respond to the stimulating light, too, and thus give erroneous results.)

The phosphorescence of thallium-activated potassium chloride at room temperature is considered to be dominated by a phosphorescent emission related to a trap depth of 0.67 e. v. and to excited states of $Tl+$ in close proximity to other Tl ions, probably $Tl+$ ions adjacent in the crystal lattice. Since the excited electron never leaves the thallous ion of which it is a part, the decay is exponential in character, persisting above background for several hundred minutes. (This type of behavior is unusual in that exponential decay laws are associated commonly with half-periods of a few micro-seconds or less, and seldom with a decay time of hours.) The results of ultraviolet irradiation of thallium-activated potassium chloride and thallium-activated sodium chloride (the thallium concentration being 0.1% by weight in each case) show operation of entirely different decay laws. To evaluate characteristics, the irradiated phosphorescing material was placed between two photomultiplier (RCA 1P28 photo) tubes, one covered by a cylinder of soft glass. In this way, the decay of the visible band alone could be measured in one tube and that of the visible and ultraviolet together in the other. (To enhance the relative "flatness" of the pure ultraviolet decay on the same time-interval base, the tube detecting ultraviolet and visible light together can be replaced by a G–M tube responsive only to the ultraviolet.) Plotting log time against log phosphorescence intensity, the curve for thallium-activated sodium chloride is a combination of exponentials and power laws. The curve for thallium activated potassium chloride is more nearly exponential, but the shape is not that of a single pure exponential plot; the decay law is essentially the same in both the visible and in the ultraviolet spectral regions.

The reproducibility and the general validity of the phototube measurement and of measurement with a photosensitive G–M tube is demonstrable. Using a photosensitive G–M tube as the ultraviolet detector and a photomultiplier as the detector of visible light, the law of decay of the ultra-violet band of silver-activated sodium chloride was studied. Such study established that the photosensitivity of the G–M tube did not vary with counting rate: Replacing the G–M tube with an RCA–1P28 phototube, the decaying silver-activated sodium chloride was placed between the two RCA–1P28 tubes, one tube being filtered by a soft glass filter and the other tube being unfiltered. The decay curve of ultraviolet and visible was found to be "steeper" than the curve of visible light alone. When the soft glass jacket was transferred from one phototube to the other, the differing decay laws were again encountered.

In the case of all of the plots on ultraviolet excitation of thallium-activated sodium chloride, a rapid decay is in evidence at times below one minute. However, this mode of decay does not appear in the case of alpha-particle excitation. It is also indicated, in both hydrogen arc and alpha particle excitation, that the intensity of the short-period decay relative to the remainder of the decay is reduced as the excitation time is increased.

Comparing the alpha-particle excited phosphorescence of thallium-activated potassium chloride with the ultraviolet-excited phosphorescence, it can be concluded that the same mechanism is involved, and that the visible and ultraviolet decay laws are nearly the same.

Irradiated samples of thallium-potassium chloride and thallium-sodium chloride were examined many hours after initial excitation to ascertain the extent of energy storage, "light storage," in the crystalline material. Each sample was irradiated for about one hour with X-rays to receive a total dosage of $\sim 20$ r. The excited samples were then placed in a dark cavity at a distance of 7 cm. from a one-watt tungsten lamp. The photostimulated emission of ultraviolet was recorded in a Geiger counter during a period of six seconds while the stimulating light was on, and observation repeated at intervals of several hours over a time of about 96 hours. Analysis shows that, after three days, a counting rate of several thousand counts per minute is obtainable from either phosphor with the use of the relatively weak source of stimulating light.

In further studies, samples of potassium chloride plus 0.1% by weight of thallium chloride, and sodium chloride plus 0.1% by weight of thallium chloride were irradiated for one hour by X-rays of maximum energy of 25 K. e. v. to receive a total dosage of $\sim 20$ r. The irradiated materials were then stored in darkness for twenty-four hours, then placed in a dark cavity and irradiated with light of wave-length greater than 3600 A. from a tungsten lamp. The photostimulated emission of ultraviolet was recorded in a photosensitive Geiger counter. The ultraviolet emission of the thallium-activated sodium chloride rose sharply, remained high while the stimulating light was on, and dropped to essentially zero when the stimulating light was extinguished at the end of one minute. In contrast, the thallium-activated potassium chloride, after one minute of photostimulation, exhibited a very considerable post-stimulation afterglow. Such results are the reverse of that encountered in the case of the silver-activated alkali halides, where post-stimulation afterglow is associated with silver-activated sodium chloride, and the ultraviolet emission of silver-activated potassium chloride drops sharply with the cessation of irradiation by the stimulating light.

Copious light emission and good storage properties characterize the silver-activated alkali halides. When silver-activated potassium chloride is irradiated by ultraviolet or by nuclear particles, the spectrum of luminescence is composed of two bands, centered respectively at $\sim 2800$ A. and $\sim 4350$ A.

A polycrystalline melt of silver (0.1% by weight)—potassium chloride, 1 cm. x 1 cm. x 0.5 cm., weighing one gram, was irradiated in darkness by 25 mc. of polonium alpha particles for thirty minutes. Immediately after cessation of bombardment by alphas, the sample was irradiated by filtered light ($\lambda > 3600$ A.) from a tungsten lamp having a total power dissipation of one watt. The lamp was located seven centimeters from the sample, which was maintained at room temperature, 25° C., by water cooling. The crystal was exhausted of stored energy in about 1,000 minutes of photostimulation by the lamp. After complete de-excitation, the same crystal was again irradiated by polonium alpha particles, and the normal unstimulated phosphorescence measured as a function of time. In each case, the excitation, photostimulation and counting were carried out with adequate exclusion of extraneous light. Comparative analysis showed that approximately 70% of the stored energy was lost through thermal processes in about 1500 minutes.

For comparison of the storage properties of potassium chloride plus 0.1% silver chloride and of sodium chloride plus 0.1% silver chloride, each phosphor received a dosage of 3r during an excitation time of 10 minutes. The "stored light" was released subsequently in six-second bursts by photostimulation at intervals of 24 hours, with the observation of photostimulated ultraviolet being made during such six-second stimulation period. The counting rate thus obtained and plotted on a graph of time in hours against log counts per minute provides a rough measure of the amount of stored energy remaining in the crystal after an elapse of time specified by the axis of abscissas of the curves plotted. Such curves show that silver-sodium chloride exhibits better storage properties than silver-potassium chloride.

To ascertain what silver concentration provides optimum "light storage," polycrystalline melts of silver-sodium chloride were prepared, with the silver concentration varied from 0.5% silver chloride by weight to 8 x 10⁻⁴% silver chloride by weight. Identical quantities of each phosphor (volume approximately 1 cm. x 1 cm. x 0.5 cm.) were irradiated for one hour to receive ~20 r of X-rays. They were stored in darkness and photostimulated by a one-watt tungsten lamp for six seconds daily, and the counting rate observed during each stimulation period plotted on a graph of time against log phosphorescent intensity. Measurement over a thirty day period showed that a silver concentration corersponding to addition of about 0.1% silver by weight yields the maximum light emission during photostimulation. (It must be noted that, while actual decay is not depicted, the amount of stored energy being perturbed by the measurements themselves, the discrepancy is uniform and weights the results equally.)

The foregoing studies show that the storage in silver-activated sodium chloride is effective for accurate measurements. In the case of the silver chloride concentration of 0.1% by weight, a counting rate of 40,000 counts per minute during photostimulation at the end of thirty days is indicated. Using a sufficiently weak stimulating light, counting rates of several thousand counts per minute could be obtained without altering appreciably the amount of stored energy. Thus, in the event of an error in making a first reading of the dosage, the phosphor could be "re-read," providing a sufficient time interval between readings is allowed.

Silver-sodium chloride can be re-used after having received a dosage of millions of roentgens. Thus, after having received a sizable initial dose, the phosphor dosimeter can be de-excited and made ready for receipt of another dose of nuclear radiation.

In use, the activated alkali halide can be placed in a light-tight capsule, and such capsule deposited in an area subjected to atomic attack. The capsule could be opened and read under standard conditions of photostimulation and detection to ascertain the previously received dosage. Knowing the time of the atomic explosion, the initial dose could be calculated: As shown in Fig. 1, an irradiated alkali halide phosphor such as silver-activated sodium chloride 11 is contained in a capsule 13 that is provided with a light-tight cover 15, the capsule and cover being pervious to nuclear radiation.

Obviously many modifications and variations of the present invention are possible in the light of the above teachings. It is therefore to be understood that within the scope of the appended claim the invention may be practiced otherwise than as specifically described.

We claim:

For indicating exposure to a brust of nuclear radiation, in combination with an alkali halide phosphor, an ultraviolet band filter located adjacent to the alkali halide phosphor for exposure to emissions therefrom in a position on one side of the material, a photomultiplier tube located adjacent to the ultraviolet band filter in position of exposure to emissions from the alkali halide phosphor through the filter, an electrical measuring device connected with the photomultiplier tube, and a second electrical measuring device measuring emissions from the alkali phosphor directly and located for exposure to the emissions in a position on a different and opposite side of the material.

References Cited in the file of this patent
UNITED STATES PATENTS

| | | |
|---|---|---|
| 2,524,839 | Schulman et al. | Oct. 10, 1950 |
| 2,551,650 | Urbach | May 8, 1951 |
| 2,673,934 | Friedman | Mar. 30, 1951 |

FOREIGN PATENTS

| | | |
|---|---|---|
| 17,666 | Great Britain | Sept. 24, 1903 |